April 3, 1951          B. L. UTTZ          2,547,101
AUTOMOBILE VANITY KIT
Filed Oct. 13, 1947          2 Sheets-Sheet 1
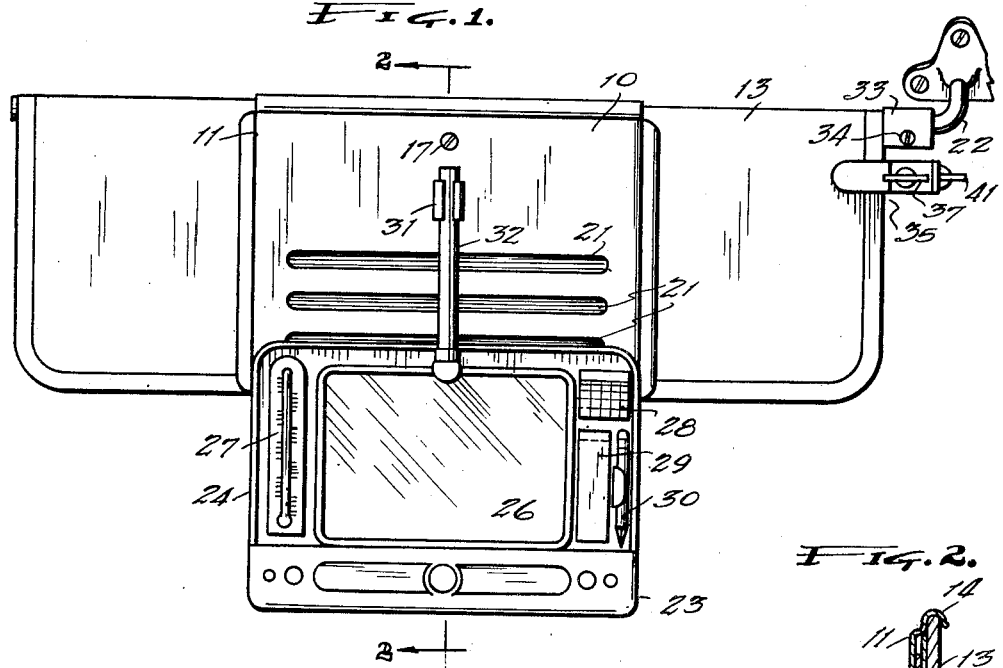
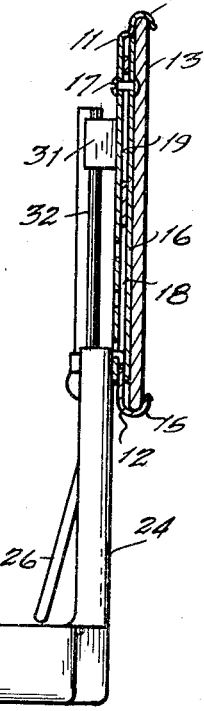
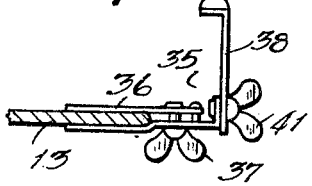
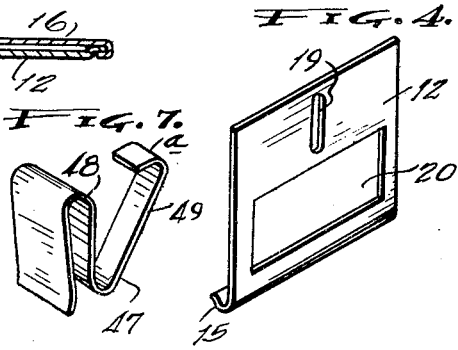
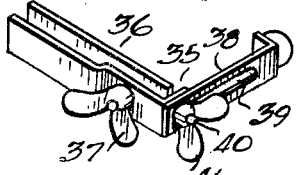
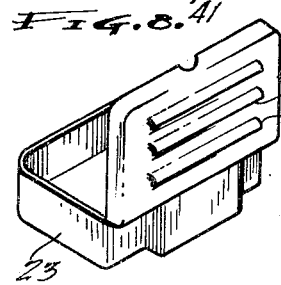
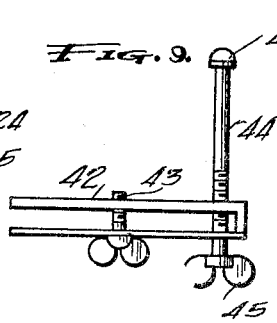
BONNIE LEE UTTZ
INVENTOR.
BY Cecil C. Atwood
ATTORNEY April 3, 1951 B. L. UTTZ 2,547,101
AUTOMOBILE VANITY KIT
Filed Oct. 13, 1947 2 Sheets-Sheet 2
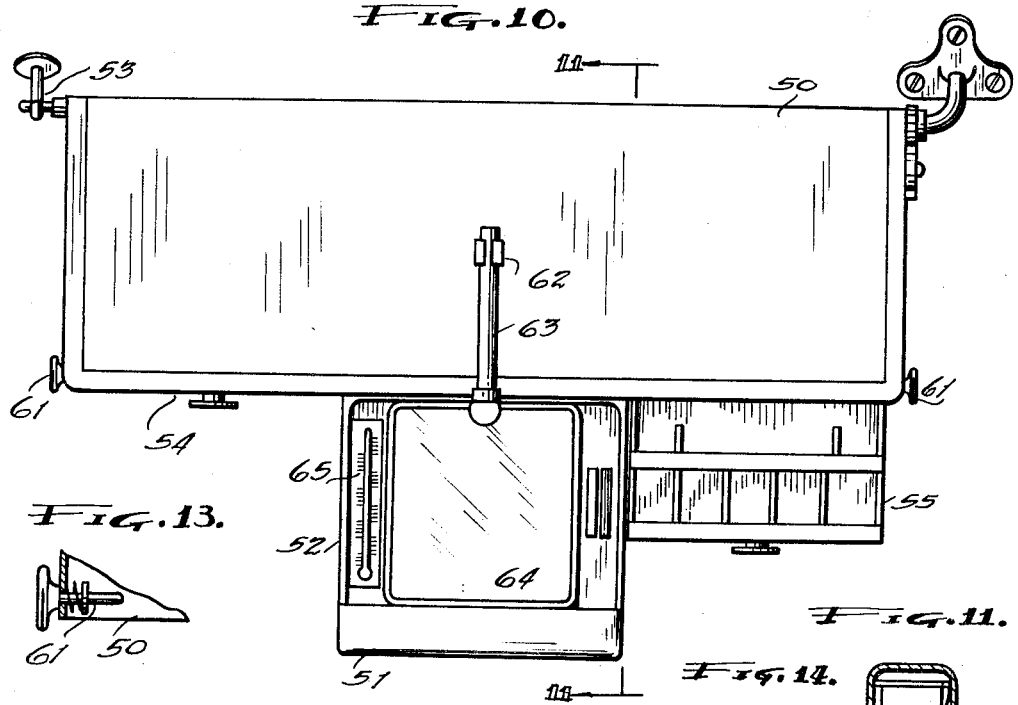
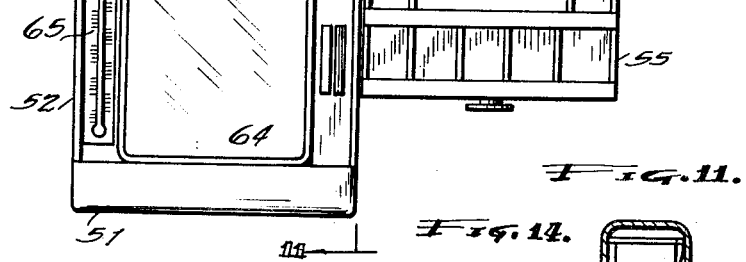
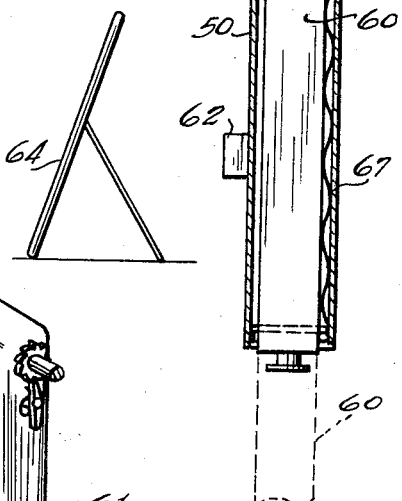
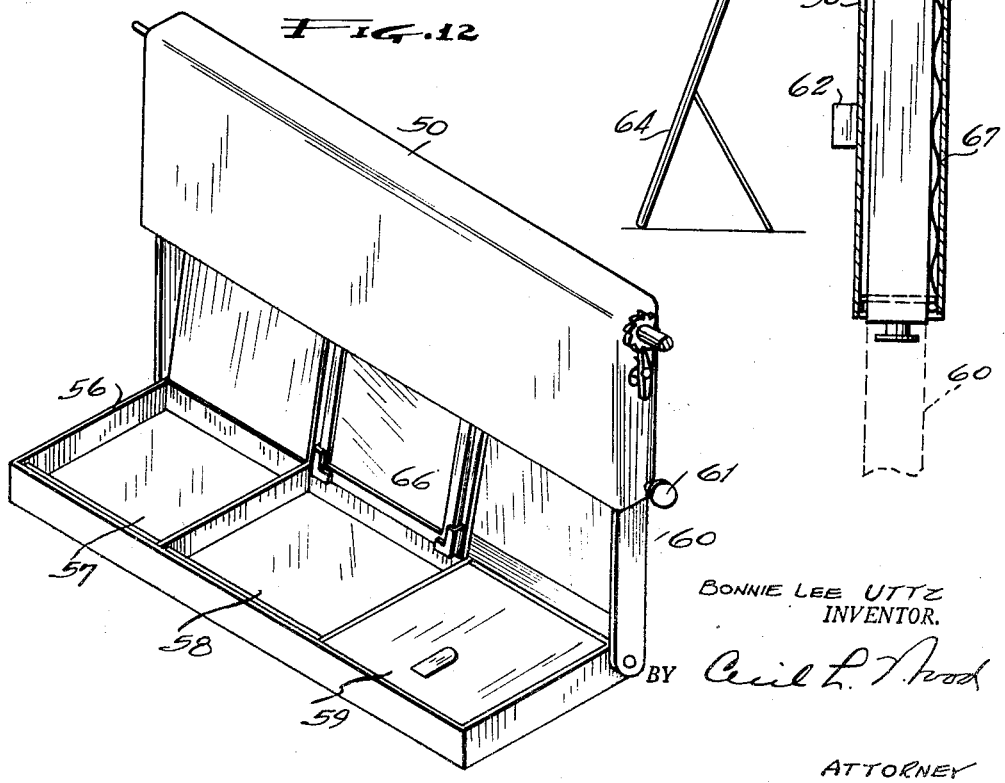
BONNIE LEE UTTZ
INVENTOR.
ATTORNEY Patented Apr. 3, 1951

2,547,101

UNITED STATES PATENT OFFICE 2,547,101

AUTOMOBILE VANITY KIT

Bonnie Lee Uttz, Fort Worth, Tex.

Application October 13, 1947, Serial No. 779,523

2 Claims. (Cl. 224—42.45)

This invention relates to cosmetic make-up kits, or vanity cases adapted to be installed in motor vehicles, or the like, and adjustably supported by especially designed brackets on sun visors, or other suitable supporting media arranged in the vehicle and comprising conventional equipment therefor, and its principal object resides in the provision of a compact and light case of suitable dimension and shape to accommodate such articles as rouge, face powder, powder puffs, lip sticks, cigarettes, and the like, and having suitable appurtenances adapting the same to be adjustably suspended from an adjustable sun visor, ordinarily providing standard equipment for the vehicle, and arranged before an occupant thereof, either behind the steering wheel, or in the seat adjacent thereto, and thus present a readily accessible carrying medium for various types of cosmetics, including a make-up mirror, and which, by reason of its attachment to the sun visor, is capable of variable adjustments to suit the requirements of the user.

Another object of the invention resides in the provision of a supporting bracket of unique design capable of being collapsibly and adjustably arranged upon the sun visor and adapted to be moved longitudinally therealong to effect the proper positioning of the device for its maximum usefulness, while yet arranging the same to be readily detached from the supporting bracket and stored in the glove compartment of the vehicle, or other suitable location, for future use.

An object of the invention resides in the provision of an attractive and compact case, of light construction, capable of being applied with a minimum of effort and requiring a minimum of space for storage and carrying, as in a woman's purse, for use outside as well as within the motor vehicle, and providing a convenient medium whereby the case can be adjustably supported upon a bracket attached to the sun visor to be moved longitudinally therealong or vertically with respect to the said sun visor and, by reason of the swinging adjustability of the latter, be adjustable at varying inclinations with respect to the vertical.

Broadly, the invention seeks to provide a convenient medium for the portability of various types of cosmetics, and other requirements, which may be conveniently carried in a motor vehicle, or in a woman's purse, as desired, affording an ever ready and compact container having flexible, utilitarian application.

While the foregoing objects are paramount, other and lesser objects will become manifest as the description proceeds, taken in connection with the appended drawings wherein:

Figure 1 is a front elevational view of the invention illustrated in operative position and supported on the rear surface of a sun visor for a motor vehicle, the mounting bracket for the invention being illustrated with a plurality of spaced, horizontally arranged slots adapting the invention to vertical adjustments.

Figure 2 is a transverse cross-sectional view of the invention, taken on lines 2—2 of Figure 1, illustrating the manner in which the same is suspended on the sun visor, illustrated in transverse section.

Figure 3 illustrates, in longitudinal cross-section, the expansible and contractible mounting bracket adapted to be secured to the sun visor of a vehicle.

Figure 4 is a perspective view of the lower slidably adjustable clip forming a portion of the mounting bracket and adapted to engage the lower edge of the sun visor in operative position, as illustrated in cross-section in Figure 2.

Figure 5 is a detailed plan view of one form of an adjustable stop for the sun visor, shown fragmentarily in transverse section, retaining the same in adjusted vertical position as against the weight of the invention thereon.

Figure 6 is a perspective view of the adjustable stop member illustrated in Figure 5, showing the clamp portion and thumb screw by which the same is attached to the sun visor.

Figure 7 is a perspective illustration of another form of stop member for the sun visor adapted to be clipped over the top thereof and adjusted longitudinally thereof as desired.

Figure 8 is a rear perspective view of the cosmetic case in open position and illustrating the securing flanges arranged longitudinally of the cover.

Figure 9 illustrates still another form of stop member for the sun visor adapted to be clamped thereon and adjusted to limit the angular movement thereof against the weight of the invention.

Figure 10 illustrates a modified form of the invention in which an especially designed sun visor is provided wherein the case can be housed therein and normally employed as a sun visor.

Figure 11 is a transverse cross-sectional illustration of the invention, taken on lines 11—11 of Figure 10 showing the cosmetic case housed within the visor and illustrating, in dotted lines, a suspending operative position.

Figure 12 illustrates, in perspective, another modified form of the invention in operative position and capable of being enveloped by the especially designed hollow sun visor, and Figure 13 is a detail view of one of the spring stops supporting the containers slidably arranged in the visor.

Figure 14 is an end view of the mirror employed in the invention supported in a normal usable manner.

Accordingly, the invention comprises an expansible and contractible bracket 10 comprising upper and lower members 11 and 12 slidably associated so that they are capable of vertical expansion and thereby may be adjustable with respect to each other to embrace a sun visor 13 of a conventional motor vehicle, as in the manner illustrated in Figures 1 and 2. The upper member 11 has a flange 14 formed thereon which is semi-circular in section, as in Figure 2, and is adapted to overreach the upper edge of the visor 13 and be suspended thereon, while the member 12, slidably connected to the member 11, also has a similar flange 15 engageable with the bottom of the visor 13, in the manner shown in Figure 2, so that when the members 11 and 12 are contracted, the visor 13 is rigidly embraced. Obviously, the bracket may be moved longitudinally of the visor 13 as desired.

The member 11 of the bracket 10 has a backing plate 16 secured thereto by a screw 17, as shown in Figures 1 and 2, and the members are spaced providing a slide 18 to receive the upper portion of the member 12 in a telescoping arrangement, the member 12 having a vertically arranged slot therein which embraces the screw 17 and permits the same to move vertically within the slide 18 in the manner just described. A rectangular opening 20 is provided in the member 12 which is in registration with a series of vertically spaced horizontal slots 21 formed in the member 11, as illustrated in Figure 1.

The visor 13 is of the conventional type, in the preferred form of the invention, and is suspended by a bracket 22 from the top of the vehicle above the windshield thereof. The visor 13 is capable of pivoting on a horizontal axis so that it can be positioned at different angles in the conventional manner. Thus, the invention, when supported thereon, can also be adjusted to various angular positions.

A container 23, shown in perspective detail in Figure 8, is provided and has a cover 24 hinged thereon by any suitable arrangement so that the same can be suspended by the latter, the vertically spaced and longitudinally arranged fins 25 formed in the cover 24 being capable of insertion into the slots 21 formed in the brackets 10. The fins 25 are shown in Figure 8. By attaching the container 23 to the bracket 10 in this manner the device is capable of being tilted to the proper angle by the adjustment of the sun visor 13 on its pivotal bracket 22. In the top or cover 24 of the container 23 there may be arranged a mirror 26 and any other articles, such as a thermometer 27, a calendar 28, and pad and pencil 29 and 30, as illustrated in Figure 1. It is obvious that any arrangement of articles may be provided in the cover 24 that may be desired and those shown and described are merely illustrative of the usefulness of the device. A clip 31 may be secured to the bracket 10, in the manner shown in Figures 1 and 2, for the purpose of detachably retaining a flash light 32 to illuminate the mirror 26.

The visor 13 is arranged on the pivotal bracket 22 through the medium of a clamp 33 held by a set screw 34, in the manner illustrated in Figure 1, tension being applied to the clamp 33 through the medium of the set screw 34 to retain the visor in its adjusted position. Under the weight of the container 23 and its cover 24, together with the contents of the container 23, the visor 13 has a tendency to swing forwardly of the vehicle and thus tilt the container 23 to minimize its usefulness. It is desirable, therefore, to provide a stop assembly 35 which may be clamped to one end of the visor 13, in the manner illustrated in Figure 1, to limit the forward swing of this member so that the container 23 and the mirror 26 in the cover 24 may be retained at the proper angle with respect to the occupant of the car. The stop member 35 is illustrated in detail in Figures 5 and 6 and comprises a clamp 36 engageable with the end of the visor 13 and secured thereon by the thumb nut 37. The stop member 38 comprises an arm in which is formed a longitudinal slot 39 through which is arranged a screw 40 having a thumb nut 41 thereon so that the arm 38 can be adjusted longitudinally and thus be capable of varying the normal degree of inclination of the visor 13 in its normal operative position.

A modified form of the stop assembly is illustrated in Figure 9 and comprises a clamp 42 securable on the visor 13 by a thumb screw 43, the adjustable engaging device consisting of a threaded rod 44 extending through the end of the clamp member 42 and having a thumb hold 45 on one end to thread the same into and out of the clamp 42 so that its head 46 will engage the ceiling of the vehicle, or the windshield thereof, and limit the forward swing of the visor 13 against the weight of the container 23 and its contents.

In Figure 7 is illustrated a clip 47 which is formed from a single piece of tensile material and has an inverted U-shaped portion 48 capable of being slipped over the top of the visor 13 while a leg 49, forming a part of the member 48, extends upwardly and at an angle to engage, at its outer end a, the ceiling of the vehicle to limit the forward swing of the visor 13 in the manner previously described. The member 47 is a simplified substitute for the arrangement illustrated in Figures 5 and 6 and the device shown in Figure 9.

In Figures 10 to 14, inclusive, are shown modified structures of the invention as illustrated in Figures 1 to 9, inclusive. In the modified structure a visor 50 is provided which forms a housing capable of receiving a container 51 having a cover 52 so that, when the container 51 is closed thereagainst, the assembly can be raised upwardly and latched within the visor 50, in the manner illustrated in cross-section in Figure 11.

In Figure 10 is illustrated a hollow type of visor 50 which may be suspended in the same manner as the conventional visor illustrated in Figure 1 except, by reason of its weight, it is supported at its opposite end by any suitable arrangement such as the pivoting bracket assembly 53. The visor 50 is so designed as to receive one or a plurality of containers 51, 54, or 55, if desired. In Figure 12 is shown a visor 50 in which may be arranged a collapsible tray 56 having a plurality of compartments 57, 58 and 59. The tray 56 may be folded against the retractable closure 60, slidably embraceable by the visor 50, and the assembly hidden in the latter and secured therein by tensioned latch pins 61, shown in detail in Figure 13.

It is also desirable to provide a clip 62 on the inner face of the visor 50, as shown in Figures 10 and 11, in which may be retained a flash light 63 to illuminate the mirror 64 in the cover 52 of the container 51, as shown in Figure 10. Other articles, such as a thermometer 65, may be arranged in the cover 52 as well as the mirror 64, which latter may be removed and utilized in a conventional manner as shown in Figure 14, if desired. Obviously, a mirror 66 may also be provided in the structure shown in Figure 12, as well as any other articles which may suit the individual requirements. A spring 67 may be placed behind the assembly 60, in the manner shown in Figure 11, to retain the same against undue movement within the visor 50, as illustrated in Figure 11.

It is contemplated that any form of container may be employed which will suitably be supported by a conventional sun visor in the manner shown and described herein, and any modifications of the structure shown and described may be resorted to from time to time by persons skilled in the art without departing from the spirit and intent of the invention or the scope of the appended claims.

What is claimed is:

1. In a cosmetic case for use in a motor vehicle, in combination with a sun visor for said vehicle, an extensible bracket capable of adjustably embracing the rear surface of said visor and having spaced slots arranged transversely thereof, a box having a hinged cover adapted to be operatively arranged vertically when said box is in open position, and means on said cover engageable with one of said slots for detachably supporting said box on said bracket.

2. In a compact case for cosmetics for use in a motor vehicle, in combination with a sun visor for said vehicle, a container having a hinged cover adapted to be suspended by the said cover so that the latter, when opened, is in a vertical position and the said case in a horizontal position, and an expansible and contractible bracket adapted to be arranged over the said visor and capable of being slidably adjusted longitudinally thereof, vertically spaced means on said bracket comprising horizontally arranged slots therein adapted to receive securing means on the said cover for suspending the assembly in operative and inoperative positions from said visor, whereby the said case can be closed and the visor arranged in normal inoperative position in said vehicle.

BONNIE LEE UTTZ.

REFERENCES CITED

The following references are of record in the file of this patent:

UNITED STATES PATENTS

| Number | Name | Date |
|---|---|---|
| 281,832 | Bryan | July 24, 1883 |
| 1,990,413 | Michaelis | Feb. 5, 1935 |
| 2,048,105 | Cobbs | July 21, 1936 |
| 2,120,892 | Francis | June 14, 1938 |
| 2,148,557 | Hook | Feb. 28, 1939 |
| 2,411,196 | Dolan | Nov. 19, 1946 |